Figure 1:
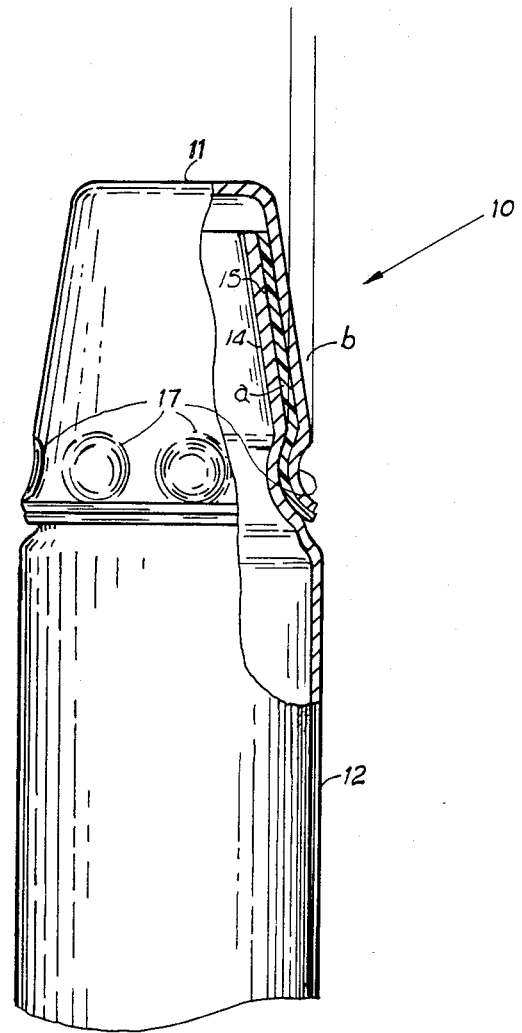

United States Patent [19]

Dey et al.

[11] Patent Number: 4,533,609
[45] Date of Patent: Aug. 6, 1985

[54] SEAL FOR ELECTROCHEMICAL CELL

[75] Inventors: Arabinda N. Dey, Needham; Noble E. Hamilton, Middleton, both of Mass.

[73] Assignee: Duracell Inc., Bethel, Conn.

[21] Appl. No.: 435,844

[22] Filed: Oct. 21, 1982

[51] Int. Cl.³ .................. H01M 2/08; H01M 2/12
[52] U.S. Cl. .................... 429/172; 429/173; 429/181; 429/185; 429/56; 206/333
[58] Field of Search ............. 429/172, 173, 185, 48, 429/175, 176, 181, 56; 206/601, 602, 331–333

[56] References Cited

U.S. PATENT DOCUMENTS

| 3,158,260 | 11/1964 | Pless | 206/331 |
| 3,343,996 | 9/1967 | Micksch et al. | 429/175 X |
| 3,969,146 | 7/1976 | Tietze | 429/176 |
| 4,124,738 | 11/1978 | Riedl | 429/56 |
| 4,307,509 | 12/1981 | McLean et al. | 429/181 X |
| 4,382,509 | 5/1983 | Gordon | 206/331 |

FOREIGN PATENT DOCUMENTS

| 0057436 | 5/1978 | Japan | 429/185 |
| 0090052 | 7/1980 | Japan | 429/185 |
| 0133754 | 10/1980 | Japan | 429/185 |

Primary Examiner—Brian E. Hearn
Assistant Examiner—Stephen J. Kalafut
Attorney, Agent, or Firm—Ronald S. Cornell; Israel Nissenbaum

[57] ABSTRACT

An inexpensive, reliable seal for an electrochemical cell comprising tapered walls adjacent the upper open end of a metal cell container and a matched angle tapered metal cell top seated thereon with an interference fit with an insulating and sealing film of minimal thickness compressively held therebetween.

20 Claims, 2 Drawing Figures

SEAL FOR ELECTROCHEMICAL CELL

This invention relates to seals for electrochemical cells and more particularly to such seals for utilization in non-aqueous electrochemical cells.

Seals for electrochemical cells are generally a tradeoff between high reliability and hermeticity such as with glass to metal or ceramic seals and the economically lower cost but less reliable seals such as crimp seals utilizing for example plastic or rubber materials as sealants and/or electrically insulating members. Factors which affect the reliability of the lower cost seals are specifically related to metal spring back (in crimp seals) and the particular characteristics of the plastic or rubber sealant material such as its permeability to electrolyte or other volatile vapors within the cell, creep or plastic flow under various pressures and thermal conditions, thermal expansion motion particularly engendered by the thermal mismatch between the metal parts of the seal and the plastic or rubber sealant material and most commonly the susceptibility to chemical degradation of such materials to cell components. This latter characteristic is of particular concern in non-aqueous cells wherein the cell components are of a particularly corrosive nature such as alkali and alkaline earth metals commonly utilized as the anodes thereof and solvents such as thionyl chloride, sulfur dioxide and a slew of organic solvents particularly including highly volatile ethers such as dimethoxyethane.

It is an object of the present invention to provide a highly reliable low cost seal for an electrochemical cell particularly for use in cells having non-aqueous components.

It is a further object of the present invention to provide such seal wherein it can further function as a slowly controlled or abrupt venting mechanism.

These and other objects, features and advantages of the present invention will become more evident from the following discussion and the drawing in which.

Figure 2:
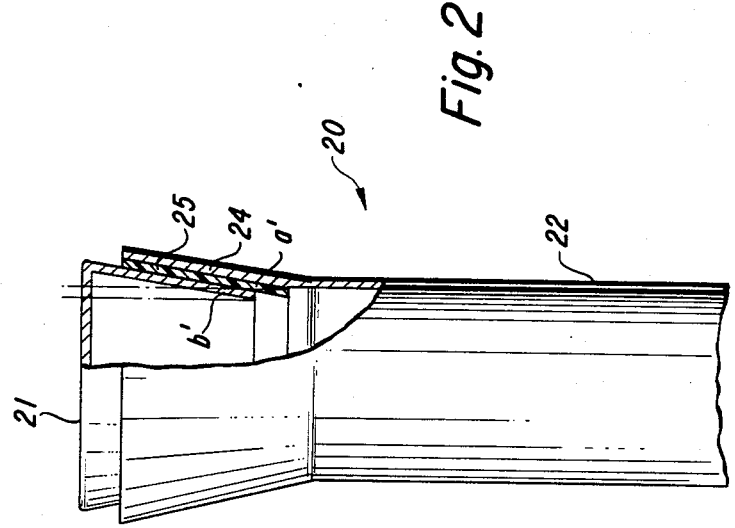

FIGS. 1 and 2 are exaggerated (for clarity) sectioned elevation views of the seal area of two embodiments of electrochemical cells made in accordance with the present invention.

Generally the present invention comprises a seal for an electrochemical cell which comprises the tapered walls adjacent the open end of a metal cell container, preferably a cylindrical container, with a matched angle tapered metal cell top seated thereon by an interference fit and an insulating sealant film of minimal thickness being compressively held therebetween. The entire cell container, if desired, may be tapered. In the preferred embodiments of the present invention reinforcing holding means such as a circumferential crimp at the base of the seal is utilized to prevent possible slow separation of the interference fitted cell top and container particularly in a pressurized cell. Other more releasable holding means such as dimples of various numbers, depths and size may be utilized in place of the circumferential crimp in providing for selective venting capability at desired venting pressures. Upon the build up of excessive pressures, the releasable holding means becomes either temporarily disengaged for slow pressure relief or may be totally disengaged with the rapid formation of a large vent, with pressure removal of the entire cell top, when the pressure build up is of greater magnitude. Some holding means, such as for button cells, may comprise a cell top which extends beyond the bottom of the cell container after the interference fit and which extension is crimped around said bottom of the container with insulation therebetween.

The matched taper angle (angular deviation from perpendicular) of both the cell container walls and the cell top range from about 0.5° to 10°. Specific angles within the range are generally a compromise between cost and performance with the smaller angles being preferred because of sealing performance and the larger angles being preferred because of cost and ease in production but at a loss in pressure retaining capability. A taper angle range of between 1° to 4° is preferred in providing an effective compromise between cost and performance with cell containers having larger diameters generally requiring larger angles within the range for an effective interference fit.

The insulating film between the tapered metal cell top and cell container walls is preferably a plastic substantially inert to cell components such as halogenated polymers including polytetrafluoroethylene (PTFE), FEP co-polymers which are co-polymers of fluorinated ethylene and propylene; $PVF_2$ which is a homopolymer of vinylidene fluoride; ETFE co-polymers which are co-polymers of ethylene and tetrafluoroethylene; CTFE polymers which are chlorotrifluoroethylene resins and E-CTFE co-polymers which are co-polymers of poly (ethylene-chlorotrifluoroethylene); and polymers having a fluorocarbon backbone and perfluoro alkoxy (PFA) side chains wherein the alkoxy radical contains from 1–6 carbon atoms.

Other generally inert materials useful for the insulating film include neoprene, polyurethane, polypropylene, polyethylene, nylon and the like.

The dimensions (thickness and length) of the sealing insulating film are generally determinative of the effectiveness of the seal of the present invention. The film should be as thin as possible while still providing adequate insulation between the metal cell top and cell container which generally function as the terminals of opposite polarity for the cell. The film thickness should be, prior to the interference fitting between the cell top and container, of such dimension that after being stretched and compressed by the interference fitting no electrical contact is made between the cell top and container by metal surface asperities piercing the film. Generally, the film thickness after the interference fitting should be several times the rms surface roughness of the interference fitting metal parts, to insure adequate maintenance of insulation during production. Adequate final film thicknesses generally range between about 0.3 to 5 mils (0.008 to 0.125 mm) and provide by the small dimensions thereof, a reduced area of exposure to the cell components and a substantial inhibition of through-sealant vapor permeation. Furthermore, there is an economical minimization of expensive but premium performance plastics. The thiness of the film provides other advantages such as reduction of the effects of the almost inherent thermal mismatch between the metal and plastic parts of the seal whereby the thermal excursion range of the seal is greatly extended. The cell may therefore be utilized over a wider temperature range with maintenance of adequate seal integrity.

The thickness to length ratio of the sealant material is another important dimensional criterion for the effectiveness of the seal. Generally such ratio should be at least 1:10 and more preferably at least 1:30 with the length of the sealant material considered within the ratio being that portion of the sealant material which is compressed by the interference fit between the metal parts of the seal. By decreasing the film thickness relative to the length of the seal, through-film vapor permeation, particularly by volatile cell components, and electrolyte leakage are significantly reduced or substantially eliminated. Furthermore, and more importantly, the rate at which the sealant material can extrude out between the surfaces which compress it with resultant seal degradation is greatly reduced by increasing the ratio of length to thickness of the sealant material in the seal.

Preferably the length of the tapered surface of the walls of the upper open end of the cell container should exceed that of the corresponding tapered cell top in order to provide sufficient room for a full interference fit, with compression of the insulating sealant film. The cell top should have a sufficient length of taper to allow for such full interference fit but without also permitting short circuiting by direct sealing contact between the cell top and container.

With the interference fit, of the seal of the present invention, substantially the entire length of the sealant material is subjected to a compressive pressure. This is in contrast to prior art crimp seals which generally provided one or two selected regions of sealing pressure on an insulating member. The extrusion resistance of the seal of the present invention is thus much greater than that of the prior art crimp seals since the sealant material does not face areas of non-compression to which it can readily flow with resultant degradation. Furthermore, the seals of the present invention are not dependent upon metal crimps which have inherent spring back which also tended to degrade seals of the prior art.

The seals of the present invention rely upon an interference fit which incorporates high levels of residual elastic strain whereby the seal is constantly maintained. Additionally, the parts are stretched to an almost perfect fit. As a result, tolerances in the manufacture of such seals are modest and costs are reduced thereby. The high compressive loads on the sealant film should, for the most preferred type of sealing, be in isostatic compression well in excess of the biaxial yield point of the sealant material. Though such loading is physically impossible over the entire seal area, the large length to thickness ratio of the seal permits the sealant material to maintain an isostatic pressure gradient which cumulates to the center of the seal to very high levels while maintaining sheer stress levels so low that creep is rendered negligible. The high isostatic pressure at the center of the seal causes flow of the sealant material in the surface irregularities of the interference fitted metal parts thereby filling the surface finish leakage paths and greatly reducing any leakage. The isostatic pressure is dependent upon the elastic reserve of the metal parts of the seal with a greater degree of interference providing a higher degree of isostatic pressure and a more reliable seal.

The cell container and the cell top interchangeably function as the opposing terminals for the cell electrodes with examples of such electrodes including lithium and other alkali or alkaline earth metal containing anodes and inactive cathodes such as of carbon for use with fluid cathode depolarizers such as $SO_2$ and $SOCl_2$ and active cathodes such as $MnO_2$, $CuCl_2$, $CF_x$, $TiS_2$ as well as other metal oxides, halides, chalcogenides etc. Volatile organic electrolyte solvents are also readily contained within the cell sealed in accordance with the present invention. Other cells for which the present invention may be utilized include aqueous cells including alkaline $Zn/MnO_2$, $Zn/HgO$, $Zn/Ag_2O$ and nickel cadmuim cells.

In order to ensure that the thinness of the film does not accidentally result in a short circuit between the matched tapered metal parts, which form the interference fit as well as functioning as the terminals for the cell (particularly since a high degree of interference fitting is desirable for obtaining a high isostatic pressure), the sealant film may be filled with a strong glass or ceramic grain. The included particles should be sized such that they are a significant fraction of the film thickness (10-90%) and they should be isolated in the film (3-30% by volume). The included particles function to bridge the sealant film from surface to opposing sealing surface and prevent contact and short circuiting particularly in the areas where the sealant can extrude such as at the edge of the sealing area and under the optional crimps utilized as additional holding means. Alternatively, a separate layer of an insulating material such as alumina-ceramic (50-50%) may be epoxy bonded to the metal in the crimp area to further insure electrical isolation.

Venting, if desired may be controlled by utilizing crimps of differing configurations, number and depths. Crimps having greater surface areas or depths as well as increasing the number of crimps will provide higher venting pressure operation. Resiliency of the metal is also partially determinative of venting with greater resiliency providing a lower pressure vent.

With specific reference to the drawing, the cell 10 in FIG. 1 is contained within metal cell container 12 having an upper open end wall 14 tapered by angle 'a' from the perpendicular walls thereof. Metal cell top 11 having a substantially matched taper angle 'b' is seated unto tapered open end wall 14 with a press interference fit. Insulating sealant film 15, positioned between tapered open end wall 14 of cell container 12 and metal cell top 11, is stretched and compressed by the interference film substantially along the entire length of the interference fit. The cell top 11, having taper angle 'b' substantially matched to taper angle 'a', is compressively seated onto tapered open end wall 14 with a press interference fit. Insulating sealant film 15, positioned between tapered open end 14 and cell container 12 and metal cell top 11, is stretched and compressed by the interference fit substantially along the entire length of the interference fit. The cell top 11 and cell container 12 are locked into the interference fit position by dimples 17. In an alternative structure the container end wall may be tapered outwardly and the cell top inwardly with the latter being wedged into the cell container end to effect the interference sealing.

FIG. 2 illustrates such embodiment wherein cell 20 comprises cell top 21 being wedged into the end 24 of cell container 22 with insulating sealant film 25 being stretched and compressed therebetween in the formation of the interference seal. Taper angle b' of the cell top 21 is substantially matched to taper angle a' of cell container end 24 in such sealing arrangement.

As an illustration of the efficacy of the present invention, the following examples are presented. It is understood however that such examples are only for illustrative purposes and that the present invention is not to be limited to the specifics enumerated therein.

EXAMPLE 1

Two open ended cylindrical containers with each having the dimensions 0.302" diameter by 1.545" height (0.77 cm×3.92 cm) comprised of low carbon steel with light nickel plate were cofittingly tapered at their open ends to a 3¼° taper angle, in a lathe using a roller in place of a cutting tool, one inwardly, (male) and one outwardly (female), for a taper distance of 0.325" (0.83 cm) for the male container and 0.245" (0.62 cm) for the female container. The outside of the taper of the male container was coated with 0.003" (0.075 mm) thick polytetrafluoroethylene (PTFE) and the container was half filled with water. The male and female containers were force fit together in an interference fit by being placed in a steel tube having cap screws, on the ends thereof which were tightened to effect the interference fit such that the diameter of the male container was reduced by about 0.002" (0.050 mm). The interference fitted containers (in the tube with one cap screw backed off for a snug but not tight fit in order to prevent possible venting and separation) were thereafter subject to the following abuse regimens in random order:

(a) 12 cycles @ 200° C.: (225 psia) totalling 200 hours
(b) 23 cycles @ −180° C.: In liquid nitrogen for 50 hours
(c) 17 cycles @ 135° C.: (45 psia) totalling 200 hours
(d) 43 cycles @ 20° C.: Totalling 300 hours Leakage was monitored by frequent weighings and the weight remained constant within 1 mg. After disassembly the water was found to have remained therein. The placement of the interference fitted containers in the steel tube with cap screws though preventing venting did not however affect the testing of the seal capability which was extraordinary and exceeded, by a wide margin seal integrity of prior art seals of comparable economy.

EXAMPLE 2

Twenty-three cells were constructed with each cell having 0.22 gm of lithium foil, as the cell anode, cold welded to the interior wall of a stainless steel container 0.302"d×1.545"h (0.77×3.92 cm). A carbon rod cathode 0.2"d×1.4"h (0.5×3.6 cm) of 90% Shawinigan Black and 10% PTFE binder was centrally located in a bobbin structure within the cell container and the cell was filled with 1.5 gms of 1.8M $LiAlCl_4$ in $SOCl_2$ as electrolyte/fluid cathode depolarizer. The upper open end of the cell container was tapered inwardly by an angle of taper of 3.25° for a distance of 0.325" (0.83 cm). A cup shaped cell top having the dimensions 0.245" length (0.62 cm)×0.312" (0.79 cm)×open end diameter (0.72 cm)×0.285" closed end diameter and an outward matched angle of taper of 3.25° was press fitted into an interference fit with the cell container. Twelve cells had 0.002" (0.05 mm) thick PTFE film compressed between the cell top and cell container in the area of the interference fit and eleven cells had 0.002" (0.05 mm) of FEP film compressed therebetween. Nine dimple crimps (0.015" depth×0.06" diameter-0.38×1.5 mm) were symmetrically disposed around the cell top at the end periphery of the interference fitted seal. Terminal cathode contact was made by a cathode pin welded to the interior of the cell top which generally pierced the carbon cathode. Each of the cells was abuse cycled over a period of 23 days under a regimen of four hours at 55° C., four hours at 20° C., 16 hours at 72° C. for each day except on days 5,6,12,13,19 and 20 when the cells were kept at 72° C. for the entire day. Weight loss for each of the cells did not exceed 0.1 mg, which was within the deviation range of the balance used in determining such weight loss. Five cells were discharged prior to the cycling regimen without discernible effect on weight loss. The OCV of the remaining 18 cells was measured after the abuse regimen with an average OCV of 3.71 being obtained thereby further indicating no significant loss of capacity or cell capability.

EXAMPLE 3

A cell constructed as in Example 2 vents at an internal pressure between 75 and 100 psi with resealing after such pressure relief.

It is understood that the above examples are for illustrative purposes and that changes may be made in the structure of the seal and in cell components without departing from the scope of the present invention as defined in the following claims.

What is claimed is:

1. An electrochemical cell comprising a metal cell container having an anode, cathode and electrolyte disposed therein with said metal cell container having an open end with the walls adjacent said open end being tapered, characterized in that said cell is sealed with a metal cell top having a complementary substantially cofitting taper being seated with an interference fit on said tapered container wall with said container being an electrical terminal for one of said anode or cathode and said cell top being the electrical terminal for the other of said anode and cathode and wherein an insulating sealant film of minimal thickness is compressively held between said tapered container wall and said cofitting tapered cell top by said interference fit and wherein said container walls adjacent said open end are tapered inwardly and said metal cell top is cofittingly tapered outwardly to be seated with said interference fit over and around said tapered container walls.

2. The cell of claim 1 wherein said container is cylindrical and said cell top is cup shaped.

3. The cell of claim 1 wherein said walls adjacent the open end of said container and said cell top are tapered by an angle between 0.5° to 10°.

4. The cell of claim 3 wherein said angle of taper is between 1° to 4°.

5. The cell of claim 1 wherein the length of said insulating sealant film being compressively held is at least ten times the thickness thereof.

6. The cell of claim 5 wherein the length of said insulating sealant film being compressively held is at least thirty times the thickness thereof.

7. The cell of claim 5 wherein said film thickness is between 0.3 to 5 mils (0.008 to 0.125 mm).

8. The cell of claim 1 wherein the length of the tapered walls adjacent said open end of said container is greater than the length of the taper of said cell top.

9. The cell of claim 1 wherein at least part of said insulating film is in isostatic compression in excess of its biaxial yield point.

10. The cell of claim 1 wherein said film is comprised of a material selected from the group consisting of neoprene, polyurethane, polypropylene, polyethylene, nylon, polytetrafluoroethylene, co-polymers of fluorinated ethylene and propylene, homopolymers of vinylidine fluoride, copolymers of ethylene and tetrafluoroethylene, chlorotrifluoroethylene resins, copolymers of poly(ethylene-chlorotrifluoroethylene and polymers have a fluorocarbon backbone and perfluoro alkoxy side chains wherein the alkoxy radical contains from 1-6 carbon atoms.

11. The cell of claim 10 wherein said insulating sealant film is filled with a glass or ceramic grain from 1-30% by volume and wherein particles of said glass and ceramic grain are sized between 10-90% of the thickness of said film.

12. The cell of claim 1 wherein substantially the entire walls of said container are tapered.

13. An electrochemical cell comprising a metal cell container having an anode, cathode and electrolyte disposed therein with said metal cell container having an open end with the walls adjacent said open end being tapered, characterized in that said cell is sealed with a metal cell top having a complementary substantially cofitting taper being seated with an interference fit on said tapered container wall with said container being an electrical terminal for one of said anode or cathode and said cell top being the electrical terminal for the other of said anode and cathode and wherein an insulating sealant film of minimal thickness is compressively held between said tapered container wall and said cofitting tapered cell top by said interference fit and wherein said container wall adjacent said open end is tapered outwardly and said metal cell top is cofittingly tapered inwardly to be seated with said interference fit inside said tapered container wall.

14. The cell of claim 1 wherein said container and said cell top are additionally held together by holding means.

15. The cell of claim 14 wherein said holding means comprises one or more crimps between said container walls and said cell top at the periphery of said interference fit.

16. The cell of claim 14 wherein said holding means are releasable under predetermined conditions of excessive pressure within said cell with said cell being vented thereby, with said holding means being completely disengaged with a full vent being formed with the opening of said sealed container end.

17. The cell of claim 15 wherein an insulative ceramic coating is positioned in the area of said one or more crimps between said insulating film and one of said container walls and said cell top.

18. An electrochemical cell comprising a lithium anode and an active cathode material selected from the group consisting of $SO_2$, $SOCl_2$, $MnO_2$, $CuCl_2$, $CF_x$ and $TiS_2$ contained within a cylindrical metallic container having an open end characterized in that the walls of said container adjacent said open end are tapered inwardly by an angle ranging between 1° to 10° with said open end being sealed by a metal cup shaped cell top having an outward taper corresponding to that of said walls whereby said cell top is seated on and around said walls with an interference fit with an insulating sealant film having a thickness between 0.3 to 5 mils (0.008 to 0.125 mm) being compressively held between said cell top and said walls by said interference fit with the length of said film which is compressively held being at least ten times the thickness thereof and wherein said container and said cell top are additionally held together by holding means.

19. The cell of claim 18 wherein said holding means comprise one or more crimps between said container walls and said cell top at the periphery of said interference fit.

20. The cell of claim 18 wherein said cell container is of a button cell configuration and wherein substantially all of the walls adjacent said open end are tapered with said cell top enclosing all of said walls in said interference fit and wherein said holding means comprises a portion of said cell top extending beyond said walls and the bottom of said container with said extending portion being crimped around said bottom.

* * * * *